Jan. 16, 1951 E. D. RANEY 2,538,212
HEATER CONTROL VALVE
Filed Nov. 17, 1948 2 Sheets-Sheet 1
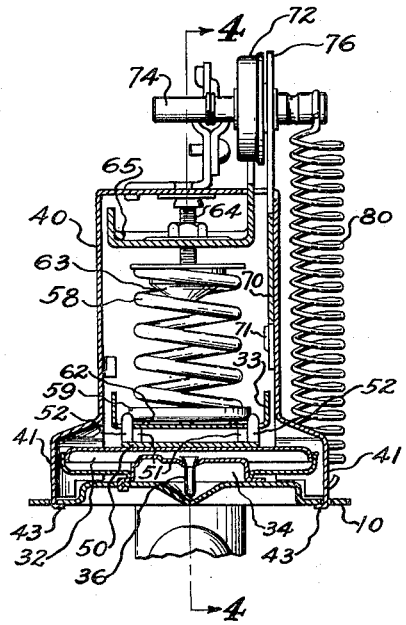
Fig. 2
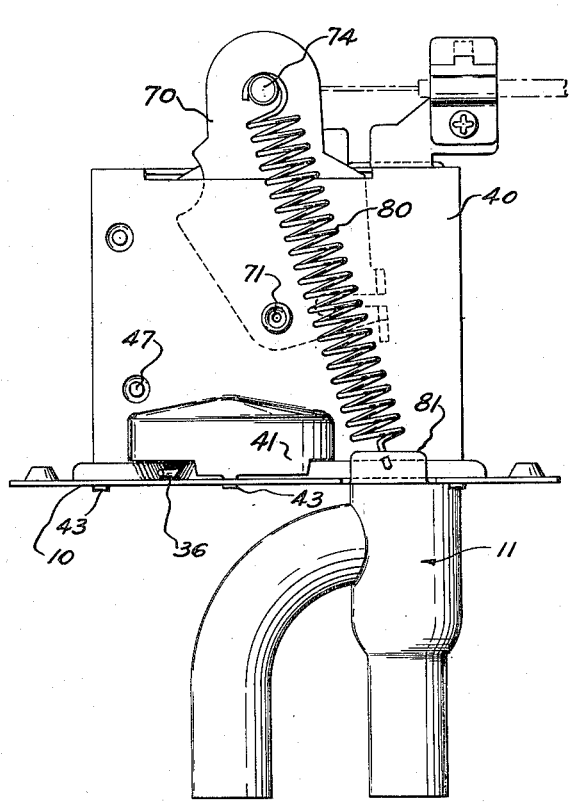
Fig. 1
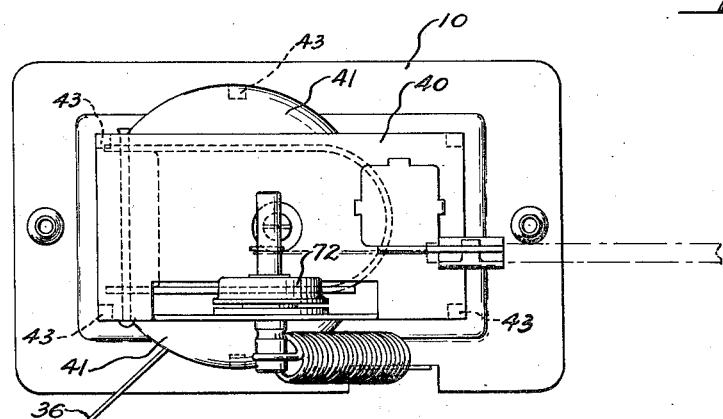
Fig. 3
INVENTOR.
ELDON D. RANEY
BY 
ATTORNEYS

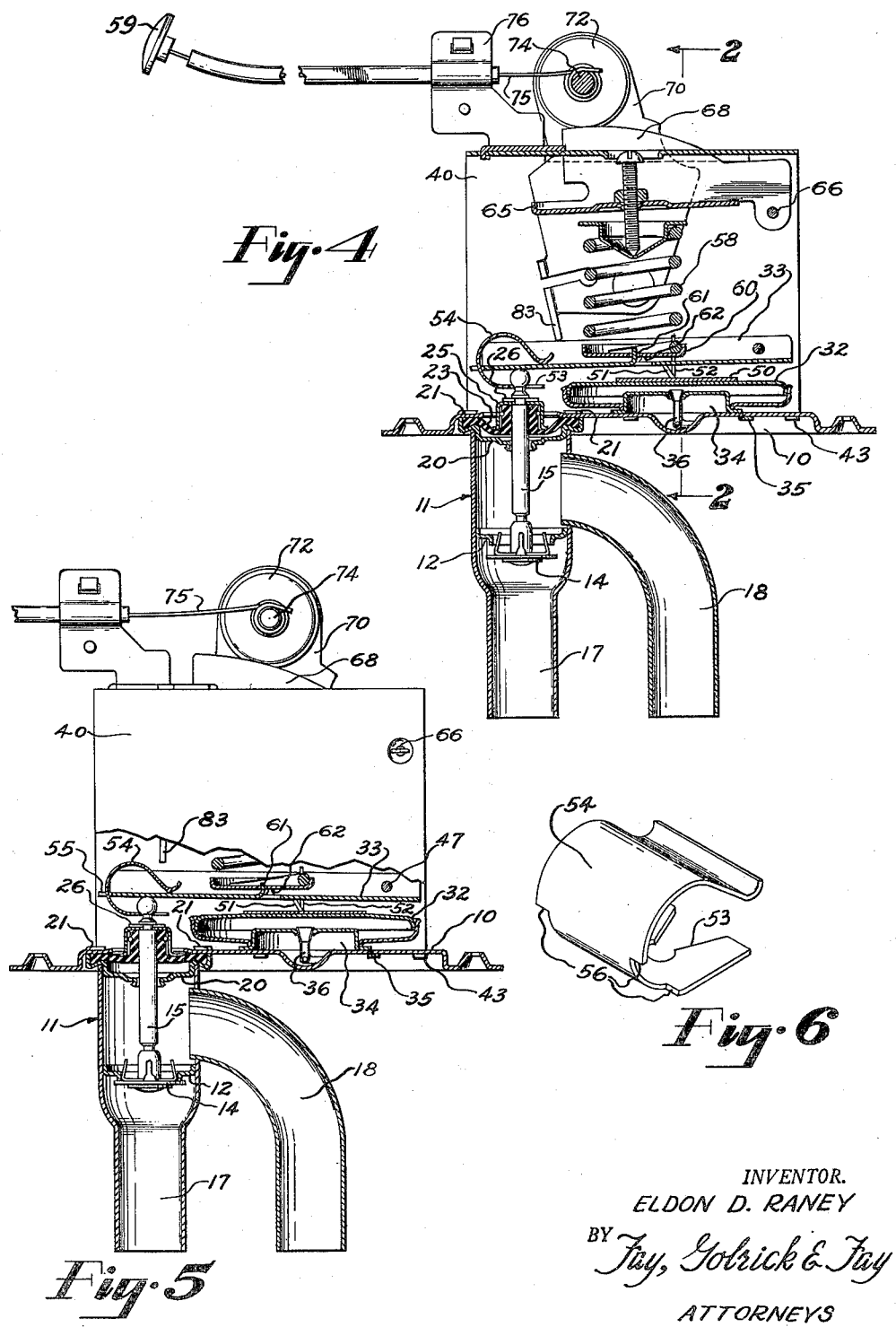

Patented Jan. 16, 1951

2,538,212

UNITED STATES PATENT OFFICE 2,538,212

HEATER CONTROL VALVE

Eldon D. Raney, Columbus, Ohio, assignor to Ranco, Incorporated, Columbus, Ohio, a corporation of Ohio Application November 17, 1948, Serial No. 60,547

4 Claims. (Cl. 236—99)

The present invention relates to a thermostatically actuated valve for automatically controlling the flow of fluid through a heat exchanger to maintain a predetermined temperature in a medium affected by the heat exchanger.

An object of the invention is to provide a thermostatically actuated valve in which the temperatures at which the valve is operated may be manually regulated by an adjusting member, and by movement of the adjusting member to one position the valve may be positively retained in one extreme position.

Another object of the invention is to provide a thermostatically actuated valve in which the connection between the valve and thermostatic device insures proper seating of the valve.

Still another object of the invention is to provide a thermostatically actuated valve in which the thermostat consists of a vapor filled expansible element having a tube connected therewith in which vapor may condense to change the internal pressure of the element, and the element is mounted in heat exchange relation with the fluid passing through the valve whereby the element is normally warmer than the tube connected therewith.

Other objects and advantages of the invention will be apparent from the following description of a preferred form of the invention, reference being had to the accompanying drawings wherein:

Fig. 1 is a side view in elevation of a thermostatic controlled valve for regulating the flow of heating fluid through a heat exchanger associated with the passenger compartment of an automobile, for example, to maintain a desired temperature in the compartment during cool weather;

Fig. 2 is a view in section taken on line 2—2 of Fig. 4;

Fig. 3 is a top plan view of the thermostatically controlled valve;

Fig. 4 is a view in section taken on line 4—4 of Fig. 2;

Fig. 5 is a view similar to Fig. 4 but showing the upper portion of the valve mechanism in elevation and certain parts thereof in different positions than shown in Fig. 4; and Fig. 6 is a perspective view of a spring.

It has become desirable to heat the interior of passenger compartments of automobiles by forcing outside air into the compartment through an air heater which is heated by circulating hot engine coolant fluid therethrough. Also, it is the practice in many instances to automatically regulate the flow of fluid through the heater in accordance with heat requirements in the compartment to maintain a predetermined comfortable temperature. The present invention is directed to a thermostatically controlled valve particularly suited to this purpose.

Referring to the drawings, wherein the valve mechanism is clearly shown, the mechanism comprises a base plate 10 which is preferably formed of a metal stamping which has a raised portion lying within the margin thereof to lend rigidity thereto. A valve chamber 11 is mounted to the under side of the plate, as viewed in the drawings, and the valve chamber includes a valve seat 12 upon which a valve member 14 is adapted to close, the latter being mounted on a stem 15 which projects upwardly from the valve chamber and through an opening in the plate 10 and is connected with a thermostatic mechanism described hereinafter.

The valve chamber 11 may be formed in any suitable manner and in the present instance it comprises a straight tube 17 having a curved tube 18 connected in the side thereof adjacent the top. The connection may be made by brazing with silver solder, for example. The valve seat 12 consists of an annular member brazed within tube 17. The upper end of the valve chamber is closed by a circular plate 20 which is brazed in the end of the tube and which has four lugs 21, only two of which appear in the drawings, which project through corresponding slots in the base 10 and these lugs are bent over to secure the valve chamber to the base. The plate 20 has a central neck-like formation therein through which the stem 15 extends and is guided to some extent by the neck formation. A fluid tight seal is effected between the stem and upper part of the closure plate 20 by a rubber-like disk 23, the edges of which are compressed between the periphery of cover plate 20 and the base plate 10. The central portion of the disk 23 has a neck formation through which the valve stem extends and a wire tightly encircles the neck to seal neck to the stem. Preferably, a protective metal cap 25 surrounds the neck and is retained in place by a wire clip 26 between the cap and a shoulder on the stem. Thus, a fluid valve is provided which is opened when the stem 15 is depressed and closed when the stem is urged upwardly.

The thermostatic mechanism comprises an expansible element 32 connected with the valve stem by an operating lever 33. The element 32 consists of a metallic wafer type expansible chamber formed by two complementary flexible disks of beryllium copper, for example, having laterally extending peripheral flanges which are telescoped and silver soldered together. The lower disk has a central opening into which an inverted cup shaped member 34 extends and a joint is formed between the member and disk by silver solder to provide a gas tight seal. The member 34 is preferably formed of copper or copper alloy to provide for good heat conduction between the base 10 and the element 32. The lower perimeter of the member 34 is flanged and the flange has three ears 35 (only one of which appears in the drawings) which extend through corresponding slots in the base and are turned over for securing the element 32 to the base. The member 34 is rigid relative to the disks forming the element 32 and provides a substantial base for the element as well as a stable wall for connecting a tube 36 with the interior of the element 32. One end of tube 36 extends into the element 32 through a central opening in member 34 and is soldered to the latter. The tube extends through a channel formation in the base 10 to the outer edge of the base and the outer end of the tube may extend several feet from the element 32, and may be coiled as at 37 to confine a substantial segment of the tube to a small area. The coiled end of the tube is closed and the tube and element contain a predetermined limited quantity of a volatile compound, such as $SO_2$, and which is in the form of vapor at temperatures approximately 70° and completely vaporized at a slightly higher temperature. That is to say, the content of the element and tube will be partially gas and partially liquid, the liquid collecting in the coldest part of the system, as is well understood in the art until a temperature of say 90° F. is attained when the $SO_2$ will be completely in the form of gas.

A U-shaped frame 40 is attached integral with the base and extends over the valve stem and the thermostatic element 32. The opposite side walls of the frame are bulged in formation as at 41 to extend over the element 32. The frame 40 is secured to the base 10 at each corner and at the outermost portions of the bulges 41 by ears 43 which extend through slots in the base and are crimped against the bottom surface of the latter. By securing the frame at the outer extremities of the bulges the frame is well braced and is rigid with respect to the base.

The valve operating lever 33 is channel shaped and is pivotally mounted between the walls of the frame 40 by a pin 47 journalled in the walls and the lever rests on the top wall of the element 32. The connection between the lever and element 32 is effected through a relatively rigid plate 50 attached to the top wall of the element and which is provided with two upwardly sloping lugs 51, one on each side of the plate for engaging opposite sides of the lever at the end edges of the lugs. A pair of lugs 52 are also formed on the plate, one adjacent each lug 51 and the former extend through slots in the lever 33 for centering the lever relative to the center of the element 32. Thus, a connection relatively free of friction is provided so that the lever will accurately respond in movement to changes in pressure in the element.

The outer end of the lever 33 is adapted to engage the end of the valve stem 15 and a connection is provided which permits movements of the stem relative to the lever to allow the valve to properly seat in the closed position. For this purpose the end of the stem has a ball formation thereon which presents a minimum of surface contact with the lever throughout various relative angular positions of the stem and lever. A C-shaped spring 54 having a slot 53 in the lower lip thereof for receiving the neck of the stem beneath the ball formation straddles the left hand end of the lever 33, as viewed in Figs. 4 and 5, and resiliently urges the stem upwardly against the lever. The lever is notched as at 55 to receive the spring 54 which is also notched on opposite sides to form shoulders 56 for engaging the lever to hold the spring in place. By this construction there may be separation movement of the stem and lever after the valve has seated without distortion or strain of the various elements involved.

The lever 33 is urged in the valve opening position by a relatively stiff coil spring 58 the tension of which determines the pressure required in the element 32 to close the valve. The tension of the spring may be adjusted manually by a pull and push knob 59 located on the instrument panel of the automobile, for example, as will be brought out more fully hereinafter. The lower end of the spring 58 rests in a cup-like member 60 which is centered on lever 33 by a lug 61 struck up from the lever and extending loosely through a slot in the cup bottom. A pair of nipples 62 are formed on the upper surface of the lever 33, and these nipples are located to be diametrically opposed with respect to the points of their engagement with the cup bottom. The nipples provide for relatively frictionless pivoting between the cup and lever. The upper end of the spring 58 receives a conically-formed member 63 having a peripheral flange resting on the end of the spring. The conical member is engaged by a screw 64 which is threaded through an adjusting lever 65 mounted above the spring. The adjusting lever 65 is pivoted at one end by a pin 66 journalled in the opposed walls of the frame and it is in the form of a channel, one side of which has a cam formation 68. A cam lever 70 is pivoted at 71 on the inside of one side wall of the frame and it carries a cam wheel 72 at one extremity which rides on the cam formation 68 for changing the position of the adjusting lever 65 as the cam lever is swung one direction or the other. The cam lever projects through a slot in the top wall of the frame and the cam wheel is journalled on a pin 74 which projects from opposite sides of the lever. A sheathed wire 75 leads from the pin to the button 59 for selectively positioning the cam lever 70 and a clamp bracket 76 is provided on the frame for holding the sheathing 77 for the wire. A tension spring 80 is attached to the pin 74 and extends to a bracket 81 formed on the base 10, the point of connection on the bracket being such that the angular pull of the spring will counterbalance the tendency of the adjusting lever 65 to remove the cam lever. By this structure the tension of spring 58 may be initially adjusted at the factory by adjusting screw 64 and locking it with a nut, and thereafter the user may adjust the spring within a predetermined range by the knob 59.

It will be seen that when the coiled portion 37 of tube 36 is placed in a location representative of the average or desired temperature in the compartment being heated, upon lowering of the temperature below a predetermined degree gas condenses in that part of the tube and the element 32 tends to collapse under the tension of spring 58 and the valve will be opened. When the temperature of the tube 36 is increased the condensed liquid volatilizes, at least in part, increasing the pressure within the element 32 and closing the valve. By moving cam lever 70 counterclockwise, the tension of the adjusting spring 58 is increased thereby requiring a higher temperature to cause closing of the valve. The flow of heated fluid through the valve causes warming of the fluid in the element 32 by conduction through the base and member 34 so that the gas in the system comprising element 32 and tube 36 will condense in the tube 36, as the latter will be the coolest part of this system.

In some instances, it may be desirable to block the valve open and for this purpose there is provided a finger 83 on the cam lever which engages the valve operating lever 33 and depresses the same to the valve opening position when the cam lever is moved to its extreme counterclockwise position, as is illustrated in Fig. 4. When the cam lever is in this position the maximum vapor pressure possible in the element 32 will be ineffective to close the valve and heating fluid will flow through the valve regardless of the temperature in the compartment.

By my invention, I have provided an accurately operating fluid valve which may be inexpensively manufactured and at the same time provide for wide range of adjustment.

Although I have described but one form of embodiment of the invention, other forms might be adopted without departing from the scope of the claims which follow.

I claim:

1. In a thermostatically operated valve including a base structure and a valve chamber attached to the base and having a valve operating stem projecting therefrom; a lever pivoted on the base for actuating the valve stem, said stem having a ball formation on the extended end thereof, said ball formation adapted to engage one side of said lever whereby said stem is movable by said lever swinging on its pivot; and a C-shaped spring resiliently retaining said end of the stem in engagement with said lever, one end portion of said spring being slotted and receiving the stem in the slot and engaging the ball formation adjacent the juncture of the stem and ball and the opposite end portion of the spring engaging the side of the lever opposite said one side.

2. In a thermostatically operated fluid valve comprising a valve chamber, a valve member in said chamber including a valve stem projecting from said chamber, a valve actuating lever connected with said stem, a spring normally urging said lever in one direction, a thermostatic element arranged to move said lever counter to said spring, in combination with an adjusting mechanism for said spring comprising, an arm connected to said spring and arranged to vary the tension of said spring when the arm is moved in one direction or the other, a pivoted member, and cam means interconnecting said pivoted member and arm for moving said arm when said member is rotated on its pivot, said member having a part engageable with said lever when said member is rotated to a predetermined position to move said lever to one extreme valve controlling position.

3. In a thermostatically operated fluid valve comprising a valve chamber, a valve member in said chamber including a valve stem projecting from said chamber, a valve actuating lever connected with said stem, a spring normally urging said lever to open said valve, a thermostatic element arranged to move said lever to open said valve, in combination with an adjusting mechanism for said spring comprising, an arm connected to said spring and arranged to vary the tension of said spring when the arm is moved in one direction or the other, a pivoted member, and cam means interconnecting said pivoted member and arm for moving said arm when said member is rotated on its pivot, said member having a part engageable with said lever when said member is rotated to a predetermined position in a direction to increase the tension of said spring and adapted to move said lever to the valve open position.

4. In a thermostatically operated valve including a base structure and a valve chamber attached to the base and having a valve operating stem projecting therefrom; a lever pivoted on the base and engaging the extending end of said stem for actuating said stem; means providing a point contact between said lever and the end of said stem, said stem having a shoulder facing said valve chamber; and a C-shaped spring resiliently retaining said end of said stem in engagement with said lever, one end portion of said spring being slotted and receiving said stem in the slot and engaging said shoulder, and the opposite end portion of said spring engaging the side of the lever opposite said one side thereof.

ELDON D. RANEY.

REFERENCES CITED

The following references are of record in the file of this patent:

UNITED STATES PATENTS

| Number | Name | Date |
|---|---|---|
| Re. 17,135 | Lawler | Sept. 6, 1932 |
| 607,406 | Coe | July 12, 1898 |
| 1,556,639 | Sheer | Oct. 13, 1925 |
| 1,875,387 | Mackintosh | Sept. 6, 1932 |
| 1,878,496 | Gulyban | Sept. 20, 1932 |
| 2,231,696 | Wolfe | Feb. 11, 1941 |
| 2,332,556 | Breese | Oct. 26, 1943 |
| 2,490,919 | Raney | Dec. 13, 1949 |